United States Patent
Cheng et al.

(10) Patent No.: US 12,298,238 B2
(45) Date of Patent: May 13, 2025

(54) VIDEO RATE MID-INFRARED PHOTOTHERMAL MICROSCOPY SYSTEM USING SYNCHRONIZED LASER SCANNING

(71) Applicant: Trustees of Boston University, Boston, MA (US)

(72) Inventors: Ji-Xin Cheng, Newton, MA (US); Lu Lan, Allston, MA (US); Jiaze Yin, Malden, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 18/234,195

(22) Filed: Aug. 15, 2023

(65) Prior Publication Data
US 2024/0053264 A1     Feb. 15, 2024

Related U.S. Application Data

(60) Provisional application No. 63/398,017, filed on Aug. 15, 2022.

(51) Int. Cl.
| | |
|---|---|
| G01N 21/359 | (2014.01) |
| G01N 21/64 | (2006.01) |
| G01N 21/65 | (2006.01) |

(52) U.S. Cl.
CPC ....... *G01N 21/359* (2013.01); *G01N 21/6458* (2013.01); *G01N 21/65* (2013.01)

(58) Field of Classification Search
None
See application file for complete search history.

(56) References Cited

U.S. PATENT DOCUMENTS

| | | | |
|---|---|---|---|
| 9,372,154 B2 * | 6/2016 | Prater | G01N 21/47 |
| 9,772,297 B2 * | 9/2017 | Nicolaides | G01N 21/1717 |

(Continued)

FOREIGN PATENT DOCUMENTS

| | | | | |
|---|---|---|---|---|
| WO | WO-2019204140 A1 * | 10/2019 | | G01N 21/171 |

OTHER PUBLICATIONS

Peter Rupprecht (Simple geometrical optics to understand and design point-scanning microscopes; A blog about neurophysiology by Peter Rupprecht, published May 28, 2022) (Year: 2022).*

(Continued)

*Primary Examiner* — David P Porta
*Assistant Examiner* — Djura Malevic
(74) *Attorney, Agent, or Firm* — Cesari and McKenna, LLP; Steven M. Mills

(57) ABSTRACT

A mid-infrared photothermal microscopy system images a sample. A mid-infrared optical source generates a mid-infrared beam which is directed along a first optical path to reach the substrate on a first side and heat the sample. A probe light source generates a probe light which is directed along a second optical path to reach the substrate on a second side and illuminate the sample. A first laser scanner is positioned along the first optical path and configured to rotate to redirect light and scan the sample with the mid-infrared beam. A second laser scanner is positioned along the second optical path and configured to rotate to redirect light and scan the sample with the probe light. The laser scanners each include at least one mirror driven to rotate such that the mid-infrared beam and the probe light scan the sample synchronously.

28 Claims, 15 Drawing Sheets

(56) References Cited

U.S. PATENT DOCUMENTS

| | | | |
|---|---|---|---|
| 9,841,324 B2* | 12/2017 | Furstenberg | G01J 3/45 |
| 10,228,388 B2* | 3/2019 | Prater | G01N 21/3563 |
| 10,228,389 B2* | 3/2019 | Yang | G01Q 20/02 |
| 10,473,693 B2* | 11/2019 | Yang | G01N 21/39 |
| 10,677,722 B2* | 6/2020 | Li | G01N 21/35 |
| 10,942,116 B2* | 3/2021 | Prater | G01N 21/35 |
| 11,199,507 B2* | 12/2021 | Koldiaev | H01L 22/12 |
| 11,280,669 B2* | 3/2022 | Gorman | G01H 9/008 |
| 11,280,727 B2* | 3/2022 | Zhang | C12Q 1/02 |
| 11,293,965 B2* | 4/2022 | Koldiaev | G01R 31/2601 |
| 11,415,617 B2* | 8/2022 | Koldiaev | G01N 21/636 |
| 11,480,518 B2* | 10/2022 | Prater | G02B 21/002 |
| 11,486,761 B2* | 11/2022 | Decker | G01J 3/108 |
| 11,519,861 B2* | 12/2022 | Prater | G01N 21/359 |
| 11,592,391 B2* | 2/2023 | Li | G01Q 30/02 |
| 11,774,354 B2* | 10/2023 | Prater | G02B 21/002 356/51 |
| 2005/0105099 A1* | 5/2005 | Shpantzer | G01N 21/171 356/517 |
| 2008/0036998 A1* | 2/2008 | Salnik | G01N 21/1717 356/36 |
| 2008/0225267 A1* | 9/2008 | Murtagh | G01N 21/1717 356/365 |
| 2008/0304046 A1* | 12/2008 | Lee | G01N 21/1717 356/51 |
| 2008/0304047 A1* | 12/2008 | Lee | G02B 21/0064 356/51 |
| 2009/0033931 A1* | 2/2009 | Murtagh | G01N 21/1717 356/317 |
| 2009/0236528 A1* | 9/2009 | Shpantzer | G01J 3/02 356/301 |
| 2012/0002030 A1* | 1/2012 | Kalkbrenner | G02B 21/16 359/385 |
| 2013/0134310 A1* | 5/2013 | Furstenberg | G01J 3/443 250/353 |
| 2014/0289912 A1* | 9/2014 | Andreev | G01N 21/3563 850/18 |
| 2014/0361150 A1* | 12/2014 | Cheng | G01J 3/2803 250/214 A |
| 2015/0110150 A1* | 4/2015 | Schmidt | G01N 21/1717 374/43 |
| 2017/0127983 A1* | 5/2017 | Spegazzini | A61B 5/1495 |
| 2017/0146455 A1* | 5/2017 | Mäntele | G01N 21/636 |
| 2018/0052186 A1* | 2/2018 | Su | G01N 21/35 |
| 2018/0066989 A1* | 3/2018 | Furstenberg | G01J 3/443 |
| 2018/0088041 A1* | 3/2018 | Zhang | G01J 5/22 |
| 2018/0180642 A1* | 6/2018 | Shetty | G01Q 30/025 |
| 2018/0259553 A1* | 9/2018 | Yang | G01Q 60/22 |
| 2019/0120753 A1* | 4/2019 | Prater | G01N 21/59 |
| 2019/0204230 A1* | 7/2019 | Ota | G16C 20/30 |
| 2019/0317012 A1* | 10/2019 | Furstenberg | G01N 21/1717 |
| 2020/0025677 A1* | 1/2020 | Prater | G01N 21/65 |
| 2020/0217643 A1* | 7/2020 | Schnell | G01N 21/4788 |
| 2021/0003504 A1* | 1/2021 | Li | G01N 21/35 |
| 2022/0018773 A1* | 1/2022 | Prater | G01N 21/636 |
| 2022/0357275 A1* | 11/2022 | Prater | G01N 21/645 |
| 2023/0129884 A1* | 4/2023 | Prater | G01N 21/636 250/341.1 |
| 2023/0236112 A1* | 7/2023 | Prater | G01J 3/2823 356/451 |

OTHER PUBLICATIONS

Duma (Laser scanners with oscillatory elements: Design and optimization of 1D and 2D scanning functions; Applied Mathematical Modelling; vol. 67; 2019; pp. 456-476) (Year: 2019).*

Thorlabs (Product Brochure; Overview section for Cross-flexure Single Axis Galvo Systems; Nov. 28, 2021). (Year: 2021).*

Amirsolaimani et al., "All-reflective multiphoton microscope," Optics Express, vol. 25, No. 19, pp. 23399-23407, 2017.

Ash et al., "Super-resolution Aperture Scanning Microscope," Nature, vol. 237, pp. 510-512, 1972.

Bai et al., "Bond-selective imaging by optically sensing the mid-infrared photothermal effect," Sci. Adv., vol. 7, pp. 1-14, 2021.

Bai et al., "Ultrafast chemical imaging by widefield photothermal sensing of infrared absorption," Science Advances, vol. 5, pp. 1-8, 2019.

Baker et al., "Using Fourier transform IR spectroscopy to analyze biological materials," Nature Protocols, vol. 9, No. 8, pp. 1771-1791, 2014.

Bhargava, "Infrared Spectroscopic Imaging: The Next Generation," Applied Spectroscopy, vol. 66, No. 10, pp. 1091-1120, 2012.

Cheng et al., "Vibrational spectroscopic imagingof living systems: An emerging platform for biology and medicine," Science, vol. 350, No. 6264, pp. aaa8870-aaa8870-9, 2015.

Duma, "Laser scanners with oscillatory elements: Design and optimization of 1D and 2D scanning functions," Applied Mathematical Modelling, vol. 67, pp. 456-476, 2019.

Garcia-Rubio et al., "The Fungal Cell Wall: *Candida*, *Cryptococcus*, and *Aspergillus* Species," Frontiers in Microbiology, vol. 10, pp. 1-13, 2020.

Katzenmeyer et al., "Absorption Spectroscopy and Imaging from the Visible through Mid-Infrared with 20 nm Resolution," Analytical Chemistry, vol. 87, pp. 3154-3159, 2015.

Li et al., "Fingerprinting a Living Cell by Raman Integrated Mid-Infrared Photothermal Microscopy," Analytical Chemistry, vol. 91, pp. 10750-10756, 2019.

Li et al., "Super-Resolution Far-Field Infrared Imaging by Photothermal Heterodyne Imaging," The Journal of Physical Chemistry B, vol. 121, pp. 8838-8846, 2017.

Lin et al., "Spectroscopic stimulated Raman scattering imaging of highly dynamic specimens through matrix completion," Light: Science & Applications, vol. 7, pp. 1-10, 2018.

Michels et al., "A Pentode Lock-In Amplifier of Hih Frequency Selectivity," Review of Scientific Instruments, vol. 12, pp. 444-447, 1941.

Noverr et al., "Regulation of Candida albicans Morphogenesis by Fatty Acid Metabolites," Infection and Immunity, vol. 72, No. 11, pp. 6206-6210, 2004.

Pavlovetc et al., "Infrared photothermal heterodyne imaging: Contrast mechanism and detection limits," Journal of Applied Physics, vol. 127, No. 165101, pp. 1-7, 2020.

Rupprecht, "Simple geometrical optics to understand and design point-scanning microscopes," A blog about neurophysiology, pp. 1-5, 2022.

Saar et al., "Video-Rate Molecular Imaging in Vivowith Stimulated Raman Scattering," Science, vol. 30, pp. 1368-1371, 2010.

Thorlabs, Product Brochure. Overview section for Cross-flexure Single Axis Galvo Systems, pp. 1-3, 2021.

Wang et al., "Nanoscale simultaneous chemical and mechanical imaging via peak force infrared microscopy," Science Advances, vol. 3, pp. 1-11, 2017.

Xi et al., "Scanning and Image Reconstruction Techniques in Confocal Laser Scanning Microscopy," IntechOpen, pp. 523-542, 2011.

Yin et al., "Nanosecond-resolution photothermal dynamic imaging via MHZ digitization and match filtering," Nature Communications, vol. 12, No. 7097, pp. 1-11, 2021.

Yin et al., "Video-rate mid-infrared photothermal imaging by single-pulse photothermal detection per pixel," Science Advances, vol. 9, pp. 1-9, 2023.

Zhang et al., "Bond-selective transient phase imaging via sensing of the infrared photothermal effect," Light: Science & Applications, vol. 8, No. 116, pp. 1-12, 2019.

Zhang et al., "Depth-resolved mid-infrared photothermal imaging of living cells and organisms with submicrometer spatial resolution," Science Advances, vol. 2, pp. 1-7, 2016.

International Search Report and Written Opinion of International Application No. PCT/US2023/030254 mailed on Oct. 31, 2023.

* cited by examiner

VIDEO RATE MID-INFRARED PHOTOTHERMAL MICROSCOPY SYSTEM USING SYNCHRONIZED LASER SCANNING

CROSS REFERENCE TO RELATED APPLICATIONS

This application claims priority to and the benefit of U.S. Provisional Patent Application No. 63/398,017, filed on Aug. 15, 2022, and entitled "Video Rate Mid-infrared Photothermal Microscopy and Uses Thereof", the contents of which are incorporated herein by reference as though fully set forth herein.

GOVERNMENT SUPPORT

This invention was made with government support under CA261726 awarded by the National Institutes of Health. The government has certain rights in this invention.

FIELD OF THE TECHNOLOGY

The subject disclosure relates to mid-infrared photothermal (MIP) imaging systems and, in particular, to an MIP microscopy system that provides simultaneous scanning of a sample by a mid-infrared beam and a probe light.

BACKGROUND OF THE TECHNOLOGY

Vibrational spectroscopy reveals wealthy compositional information of sample by telling their molecular structures through infrared (IR) and Raman spectra. With spatial fingerprinting capabilities, IR and Raman microscopy have been widely used for visualizing the chemical constituents of biological systems and materials on a microscale. Although IR and Raman methods both gauge the molecular vibrations, their different physics contrast mechanisms make them fit in different specific applications and convey complementary information: IR absorption based on dipole moment is sensitive to unsymmetric vibration bonds like C—O, C=O; while Raman scattering that is proportional to molecules' polarizability is sensitive to C—H, C=C. By measuring the IR attenuation caused by absorption, Fourier transform IR spectrometry microscope finds broad applications. IR absorption has a large cross-section ($\sim 10^{-22}$ $cm^2 sr^{-1}$) that is 100 million times larger than Raman scattering ($\sim 10^{-30}$ $cm^2 sr^{-1}$) and wide spectral coverage for distinctive molecular features, which makes it attractive as a highly sensitive imaging method. However, its application to living system imaging has been hindered due to the low spatial resolution (a few micrometers) and strong water background at the O—H bond, when compared with Raman microscopes.

To improve the spatial resolution of IR imaging, near-field scanning approaches have been developed. By directly measuring the IR scattering from a sharp tip, scattering-based scanning nearfield optical microscopy (s-SNOM) firstly boosts the IR imaging resolution into 20 nm. Yet, due to its complex contrast origin, s-SNOM hardly provides absorption information quantitatively. To compensate the distorted absorption spectrum, atomic force microscope-infrared (AFM-IR) is invented. Through measuring the absorption-induced photothermal process, chemical imaging with 20 nm spatial resolution has been achieved, and the tapping mode method is then introduced to further push the spatial resolution to 10 nm. While succeeding in characterizing material properties at the nanoscale, all the near-field methods are limited to in vitro surface characterization. Moreover, hourly imaging speed makes it hardly used for visualizing any fast dynamics or high throughput characterization.

By optically sensing the mid-infrared induced photothermal effect in the far-field, mid-infrared photothermal (MIP) microscope was developed as a novel method that enables the super-resolution IR imaging in the far-field. MIP employs a probe beam to probe the transient temperature rising induced by a short-pulsed IR excitation. Such local temperature modulation introduces thermal expansion and refractive index alteration. Those changes are collectively revealed by detecting the scattering intensity modulation using a shorter wavelength probe beam probe, enabling IR spectroscopic imaging at the submicron scale. The probe beam may comprise visible wavelengths, and/or near IR and UV wavelengths. Moreover, the indirect measurement of the absorption effect bypasses the water background issue that hinders IR imaging applications for living systems. Since the first high-quality imaging demonstration of a living system in 2016. This method is quickly expanded with various recent innovations and enables broad applications.

Photothermal imaging is essentially measuring a small modulation on a large scattering background. Conventionally, this task is achieved through heterodyne detection at the IR pulse rate via a lock-in amplifier. Due to the nature of the photothermal process, the demodulation frequency is below megahertz, where laser noise is usually large. As a result, to extract the signal over laser noise and shot noise, a pixel acquisition time of a few milliseconds is required. Spatial multiplexed photothermal detection using the CMOS camera has been invented to improve detection efficiency. In such a system, photothermal contrast is acquired by subtracting the camera captured frames between IR on and off status. However, CMOS sensors have a limited photon budget on the level of tens of ke-. Thousands of frames averaging is mandatory to resolve the modulation depth by about 1%. Furthermore, excitation fluence of weakly focused IR significantly diminished with the field of view. High energy mid-infrared laser source must be used for compensation. The bioimaging speed of the current photothermal microscope is limited to minutes per frame which is insufficient for capturing dynamics inside living systems or large areas with high throughput imaging.

To achieve high sensitivity detection at a fast speed, the imaging system not only needs a large probe photon capacity for resolving the small modulation over shot noise but also a non-diluted IR excitation at a high repetition rate. Therefore, there is a need for an MIP system with improved speed while maintaining image quality. The above-mentioned problems are addressed, as discussed herein, with a newly designed photothermal microscope structure.

SUMMARY OF THE TECHNOLOGY

In brief summary, in light of the needs described above, the present disclosure includes a single pulse laser-scan MIP microscope that allows high-sensitivity and high-speed imaging at video-rate. Firstly, the subject disclosure described a lock-in free demodulation scheme using high-speed digitization, which improved the system response to nanoseconds level to resolve a single IR pulse induced contrast. In order to achieve video-rate scanning-based imaging, there is a system response at each pixel that is sub-microsecond. Unlike coherent Raman microscopy, the modulation rate in photothermal microscopy is limited to 1 MHz or lower to avoid thermal accumulation in photothermal microscopy. In such a scenario, the photothermal contrast at each pixel needs to be extracted within a single IR excitation period, which makes lock-in filtering ineffective in picking up the signal from the noisy background. The disclosed system overcomes this difficulty by substituting the lock-in based narrowband detection with a wideband amplifier and a megahertz digitizer for time-gated detection. Using this method, the photothermal modulation induced by a single IR pulse can be resolved in the time domain. With improved system response a faster imaging scheme, rather than sample scanning, is needed to match the expected pixel dwell time of microseconds. To address this issue, the disclosed system can include two laser scanning mechanisms, e.g. sets of galvo mirrors for synchronized scanning of both the focused mid-infrared and the probe beams to achieve a line rate over 2.5 kHz. These synergistic innovations allow, for the first time, microsecond-scale acquisition of photothermal signal from a single IR pulse at each pixel.

The system provides video-rate (25 Hz) imaging (150× 100 pixels) of chemical dynamics in a living cell. Moreover, synchronized scanning of IR and probe beam allows uniform illumination of a large field of view (over 400 µm) for high throughput chemical scrutinization. With such capacity, we captured fast lipid dynamics inside a living fungal cell. Video-rate imaging further allowed the spectroscopic decomposition of a single cell wall. The ultrastructure of the cell wall (outer wall, inner wall, and membrane) is revealed based on their distinct IR absorption. Compared with the previous lock-in based, sample-scanning MIP microscopes, the disclosed system increases the speed by three orders of magnitude (from millisecond per pixel to microsecond per pixel). Broad applications to a wide range of living systems are demonstrated, as detailed below.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1A:
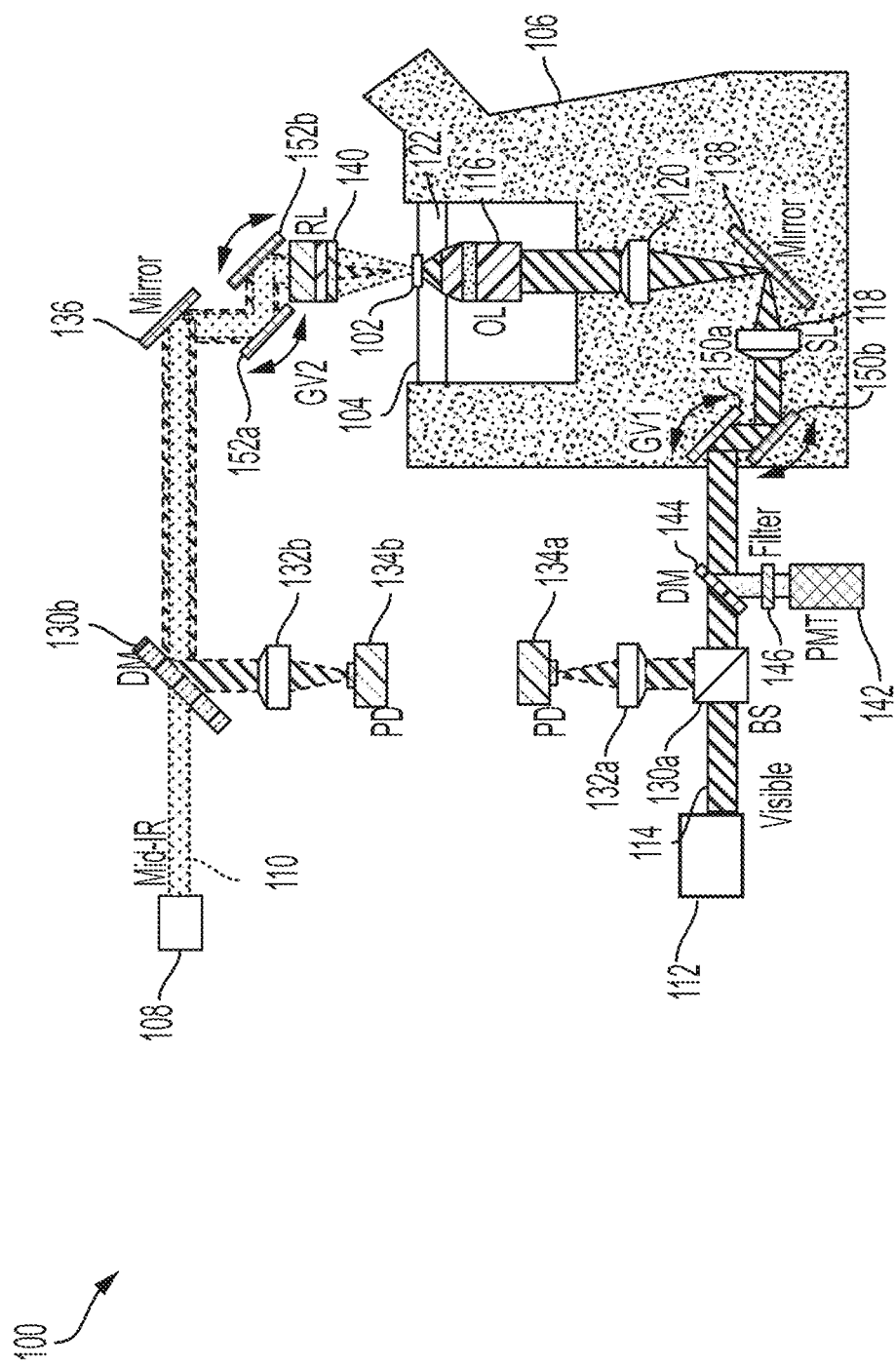
FIG. 1A is a schematic diagram of an MIP microscopy system using laser scanning mirrors in accordance with the subject technology.

The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e., where an "upper" part must always at a higher elevation).

As discussed in more detail below, the system described herein can include software, and can be implemented through one or more designated computers and/or servers configured to execute software instructions and carry out functions in accordance with the teachings herein. It should be understood that as part of this system, commercially available hardware components may be employed to run the software described herein. However, that hardware must be particularly configured to carry out the software instructions, in accordance with the teachings herein.

More particularly, functions of systems and methods described herein can be implemented in digital electronic circuitry, in computer hardware, firmware, software and combinations thereof. As described herein, a computer program can be provided in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps and functions can be performed by one or more programmable processors executing a computer program to perform functions of the invention by operating on input data and generating output. Method steps can also be performed by an apparatus which can be implemented as special purpose logic circuitry. The circuitry can, for example, be a FPGA (field programmable gate array) and/or an ASIC (application specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the system and methods described herein can be implemented using a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The systems described herein can include a distributed computing system that includes a back-end component. The back-end component can, for example, be a data server, a middleware component, and/or an application server. The systems descried herein can be include a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers for data transmission. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices for transmitting or receiving signals can include, for example, a computer, a computer with a browser device, a telephone, an IP phone, a mobile device (e.g., cellular phone, personal digital assistant (PDA) device, laptop computer, electronic mail device), and/or other communication devices.

In brief summary, a new MIP microscopy system is disclosed herein. By optically sensing absorption-induced photothermal effect, mid-infrared photothermal (MIP) microscope enables super-resolution IR imaging of biological systems in water. However, the speed of current sample-scanning MIP systems is limited to milliseconds per pixel, which is insufficient for capturing living dynamics. Here, by detecting the transient photothermal signal induced by a single IR pulse through fast digitization, this disclosure describes a laser-scanning MIP microscope that increases the imaging speed by three orders of magnitude. To realize single pulse photothermal detection, synchronized galvo scanning of both mid-infrared and probe beams are utilized to achieve an imaging line rate over 2 kHz. Using the system disclosed herein, and with video-rate speed, we observed the dynamics of various biomolecules in living organisms at multiple scales. Furthermore, by hyperspectral imaging, we chemically dissected the layered ultrastructure of fungal cell wall. Finally, with a uniform field of view over 200 by 200 μm$^2$, we mapped fat storage in free-moving C. elegans and live embryos.

Figure 1B:
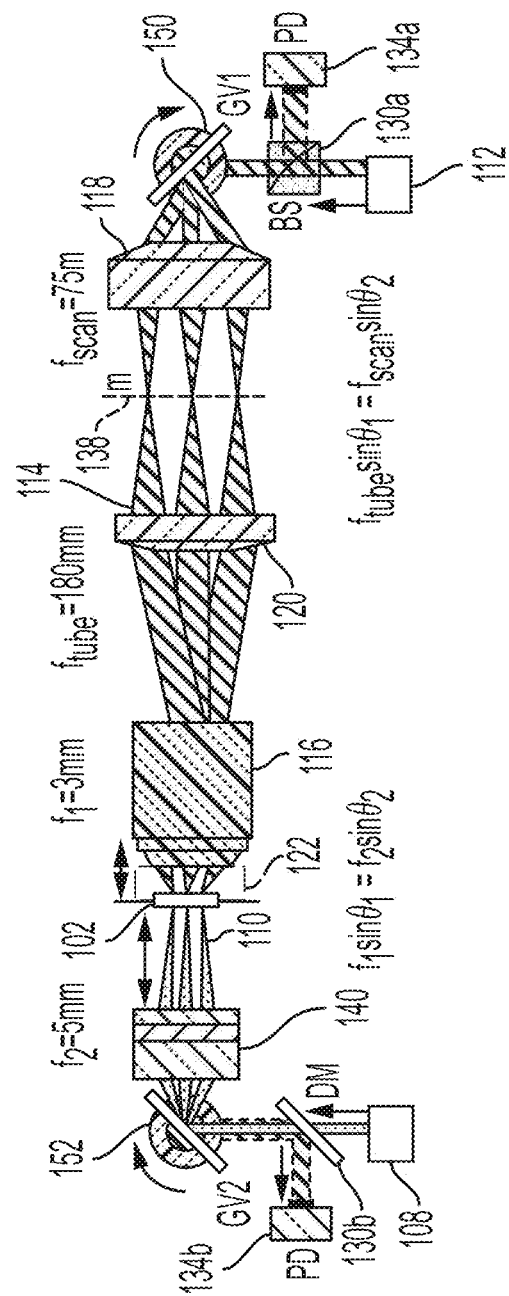
FIG. 1B is a schematic diagram of the system of FIG. 1A showing a laser scan scheme in accordance with the subject technology.

Referring now to FIGS. 1A-1B, an exemplary MIP microscopy system 100 capable of video-rate MIP imaging of a sample 102 on a substrate 104 is shown. The system 100 utilizes an inverted microscope frame 106. An IR source 108 provides a pulsed IR excitation beam 110 for heating the sample 102. This can be, for example, a pulsed quantum cascade laser from MIRcat 2400, Daylight Solutions, or the like. The IR repetition rate is controlled externally between 500 kHz to 1 MHz, with a duty cycle of less than 30%. A probe light source 112 provides a probe bream 114 of probe light for imaging the sample 102. The probe beam 114 can be provided by a continuous-wave laser with a center wavelength of 532 nm, for example. In one embodiment, the probe beam can be a Samba 532 by Cobolt or the like. The IR beam 110 is provided to excite the sample for imaging, while the probe light 114 reflects off and/or passes through the sample 102 and is captured (e.g. by photodiodes 132a, 132b) to image the sample 102. In particularly, the photodiode 134a detects light that reflected off the sample 102 while photodiode 134b detects light that passed through the sample 102.

The system includes two laser scanners, for example two pairs of galvo mirrors 150a, 150b, 152a, 152b which are rotated to deflect light within the system 100. Alternately, other laser scanning devices such as fast steering mirrors, micromechanical mirrors or other laser scanning devices that can steer a beam in at least one axis can be used. In one embodiment, a first pair of galvo mirrors 150a, 150b (generally 150) are positioned in the path of the probe beam 114, and rotation of the first pair of galvo mirrors 150 scans the probe beam 114 across the sample 102. The galvo mirrors 150a, 150b can be positioned to scan parallel to one another in the path of the probe beam 114. In one example, the galvo mirrors 150 can be Saturn 1B ScannerMAX X-Y galvo mirrors or the like. The galvo mirrors 150 can be rotated to rapidly scan with the probe beam 114, for example, at a high resonant frequency (e.g. at 3 kHz). Other resonant frequencies may also be used for scanning depending on the details of the laser scanner/galvo mirror system used. The scanned probe beam 114 is conjugated to the back pupil of the objective lens 116 with a scan lens 118 (e.g. with a focal length of 75 mm using a doublet pair of AC508-150-A from Thorlabs) and a tube lens 120 (e.g., with a focal length of 180 mm using a TTL180-A from Thorlabs), introducing a beam expansion of 2.4 times. This substantially fills the back pupil of the objective lens. The scanned probe beam 114 is focused on the sample 102 through a water immersion objective lens 122 (e.g., UPLSAPO 60X 1.2NA from Olympus or the like).

The second pair of galvo mirrors 152a, 152b (generally 152) are positioned in the path of the IR beam 110 and rotation of the second pair of galvo mirrors 152 scans the sample 102 with the IR beam 110 to excite the sample 102. In one example, the galvo mirrors 152a, 152b are positioned to scan parallel to one another in the path of the IR beam 110. The galvo mirrors 152 can be X-Y galvo mirrors such as GVS002 from Thorlabs or the like. The galvo mirrors are placed within 200 mm from a reflective objective lens 140 (e.g. LMM40X-P01 40X 0.5NA from Thorlabs, or the like). The focus of the IR beam 110 is aligned to overlap with the probe beam 114 focus before imaging. During the imaging process, the IR focal spot is synchronously scanned with the probe beam, which maintains uniform excitation and probing in a large field of view.

As discussed in more detail below, the beams 110, 114 are scanned in the forward and backward directions by the galvo mirrors 150, 152. After reaching the sample 102, probe light can return along a similar path to the transmission path of the probe light beams 114 until reaching the beam splitter 130a. The beam splitter 130a can be of any known type which allows for deflection of some light, while allowing some light to pass therethrough (e.g. a 50/50 beam splitter). In the example shown, the beam splitter 130a allows some transmitted light from probe light source 112 to pass therethrough along a first axis, while deflecting returning light to a second axis and through a detector lens 132a and to a photodiode 134a which detects the light. The photodiode 134a detects the light and with optional amplification/filtering can convert the light in an electrical signal for further processing. The synchronized scan of the galvo mirrors 150, 152 generates a line scan of the sample 102, which allows for photothermal detection at each pixel over the scanning process.

Likewise, probe light can also be allowed to pass through the sample 102. Probe light passing through the sample 102 can travels a return path to the transmission path of the IR beam 110 until the beam splitter 130b, where the returning probe light is split towards a detector lens 132b and photodiode 134b which detects the light. The beam splitter 130b can be a dichroic mirror, allowing the IR beam 110 to pass therethrough while blocking probe light towards the photodiode. The photodiodes 134a, 134b can be, for example, silicon photodiodes (e.g. DET100A from Thorlabs, or the like) connected with a home-build pre-amplifier and filtering circuit.

It should be understood, that other typical optical component (e.g. lens, mirrors) and/or electrical components (power supplies, amplifiers, processing equipment) may be included to allow the system to function as described herein. For example, FIG. 1A shows an exemplary system with and additional mirror 136 within the IR beam path for redirecting the transmitted IR beam 110 and the probe light beam returning along the IR beam path. Another additional mirror 138 is positioned in the probe light path to redirect probe light within the system.

In some cases, the system 100 can include an additional low light detector 142, e.g. a photomultiplier tube (PMT), avalanche photodiode (APD), or similar. The additional low light detector 142 collects and measures light, including the effects of the modulated fluorescence from sample 102. The system can include a dichroic mirror 144 which deflects returning light from the probe light path 114, through a filter 146, and to the PMT 142. This combination enables simultaneous measurement of IR absorption and sample fluorescence.

Figure 1C:
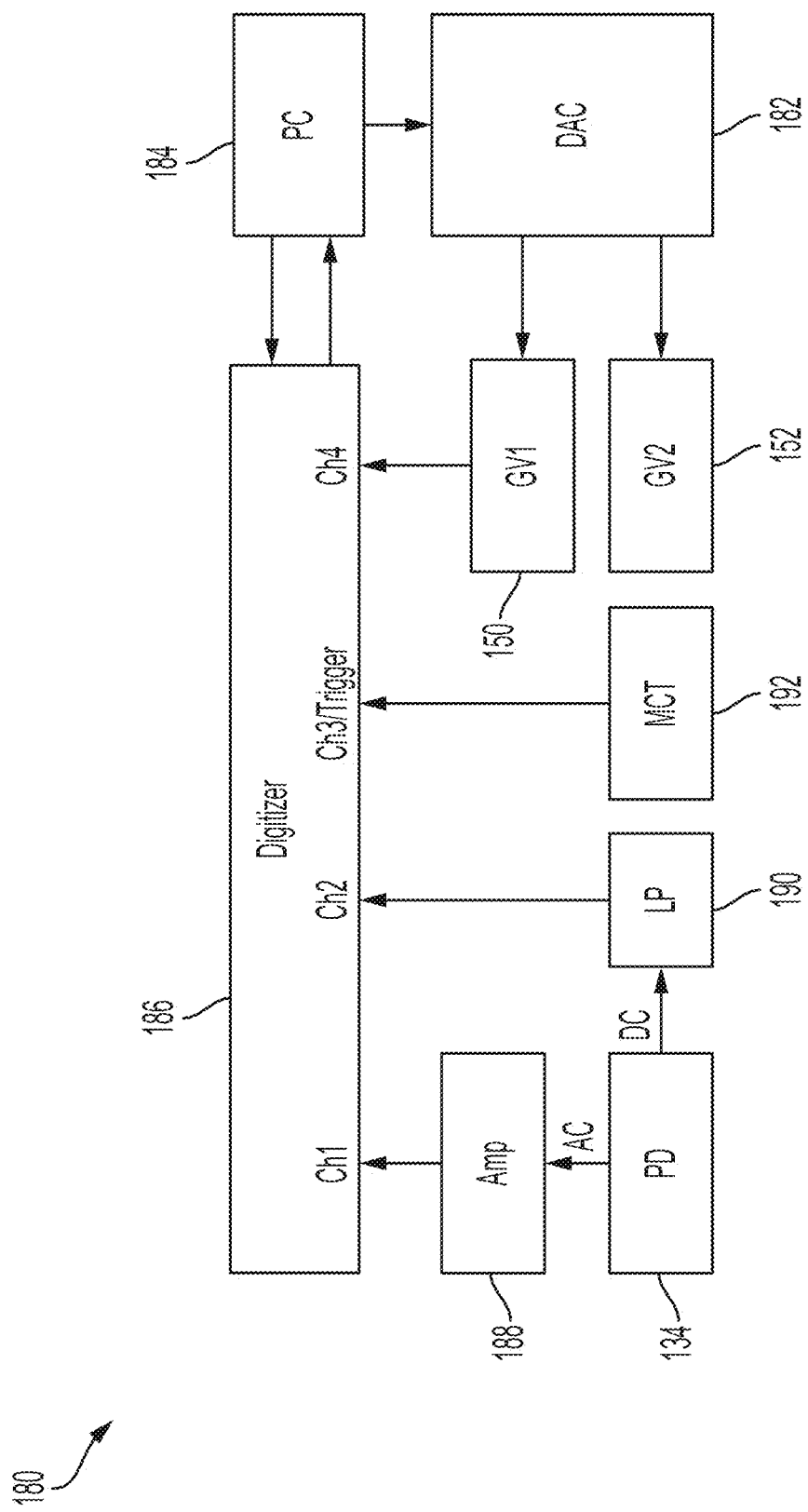
FIG. 1C is an electronics diagram of the system of FIG. 1A, in accordance with the subject technology.

Referring now to FIG. 1C, an electronics diagram 180 of the system 100 is shown. Overall, the functions of the system can be controlled by a processor 184 which interfaces with all other components of the system. The processor 184 can include typical hardware and software components to carry out the functions described herein, including components configured to provide for communication with other components of the system 100. A high-speed digitizer 186 is included to process analog signals detected by other components and convert them into digital form. The digitizer can then communicate the digital signals to the processor 184.

To drive the two pairs of galvo mirrors 150, 152, four control signals are generated, for example analog signals can be generated by a digital-to-analog (DAC) device 182 (e.g. PCIe-6363 from National Instrument or the like) and used for galvo movement control. Similar control can be provided for alternate laser scanners as required. The two pairs of galvo mirrors 150, 152 are synchronously scanned with an angle scaling factor calculated by the focal lengths of probe and IR objectives and the beam expansion ratio of the relay systems, which is calibrated prior to use. This angle scaling factor can also be determined empirically by optimally overlapping the IR and probe beams, for example using a strength of detected photothermal signal as an indicator of the efficiency of the overlap and synchronization.

The angle scale factor is applied to ensure the IR and probe beams 110, 114 can be focused on exactly the same spot at the same time during the scanning process. The galvo mirrors are rotating the beam into a certain angle, the following optics relay and focus that certain angle into a spatial position on the sample. But for different optics, this angle to position relationships are not the same. In our system, we specially designed the two independent IR/probe beam paths, which introduce such a difference in galvo scanning process. Thus, the scale factor will be used to compensate for the optics difference (including objective focal length, beam expansion ratio, etc.).

Signals from the photodiodes 134a, 134b (generally 134) can be sent to a respective amplifier 188 which can provide a scalable gain from 40 dB to 96 dB, with the highest bandwidth of 500 MHz. The amplified signal is directly sent to the high-speed digitizer 186 with a sampling rate of 50MS/s (e.g. Oscar 14 bit, Gage applied). The photodiodes 134 also interfaces with respective low pass filters 190, which interface directly with the digitizer 188. In some cases, the system 100 can also include a Mercury-Cadmium-Telluride (MCT) detector 192, which can be detect returning IR pulses and provide detected signals to the digitizer 186.

Figures 2A, 2B, 2C:
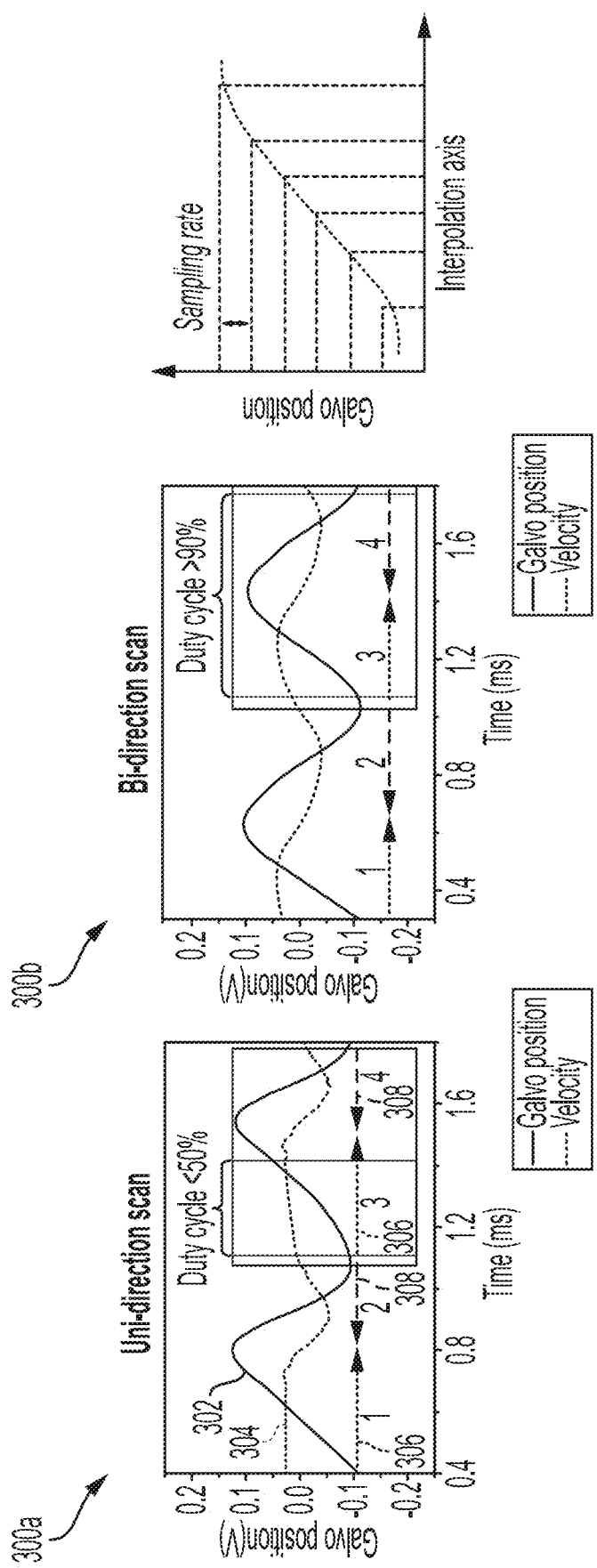
FIG. 2A is a graph of galvo mirror position and velocity during a uni-direction scan, in accordance with the subject technology.
FIG. 2B is a graph of galvo mirror position and velocity during a bi-direction scan, in accordance with the subject technology.
FIG. 2C is a graph of a method of image reconstruction based on galvo mirror position and velocity during a bi-direction scan, in accordance with the subject technology.

The laser scanning and image reconstruction scheme used in the system 100 will now be discussed, with reference to FIGS. 2A-2F. As discussed above, the system 100 two laser scanners to synchronously scan the mid-IR and probe beams to overlap through the whole scanning process. The embodiment shown in FIG. 2 uses pairs of orthogonally oriented galvo mirrors for realizing a video-rate raster scan of the IR and probe beams in X and Y direction (i.e. over a plane). In alternate embodiments, other laser scanning mechanisms can be employed, for example fast steering mirrors that can tip/tilt in two substantially orthogonal axes. In FIGS. 2A-2B, graph line 302 represents galvo mirror position over time, while graph line 304 represents galvo velocity over time. Arrows 306, 308 represent a rotational cycle of a galvo mirror in one direction. For example, arrows 306 represent rotation of a galvo mirror in a first direction, and arrow 308 then represents rotation of the galvo mirror in a second direction opposite the first direction.

The raster scan is generally performed with two types of methods, the uni-directional (shown in graph 300a) and bi-directional scan (shown in graph 300b). For imaging line rate below 1 kHz, a uni-directional scan is adapted for its uniform scanning speed and negligible backlash errors. However, when operating the galvo mirrors at a rotational speed faster than a critical speed (e.g. 1 kHz for some galvos employed), the uni-directional scan can have a limited imaging duty cycle of less than 50%, as shown in FIG. 2A. In this approach, the system 100 may spend more than half of the time turning the galvo back, resulting in a slow imaging speed. To achieve a higher scanning line rate, e.g. over 2 kHz, a bi-directional scanning and image reconstruction scheme may be used. In an embodiment, the galvo mirrors 150, 152 can be driven at its resonant frequency over 2 kHz with a sinusoidal rotation movement as shown in FIG. 2B. The signal detection is performed in both directions of galvo mirror movement, providing doubled imaging efficiency with a duty cycle of greater than 90%. To address the image distortion caused by nonlinear scanning velocity and backlash error, the galvo position sensor is synchronously acquired as feedback. A galvo position sensor can also be included within the system 100, particularly to provide feedback related to the galvo scanning mirrors 150, 152.

Figure 2E:
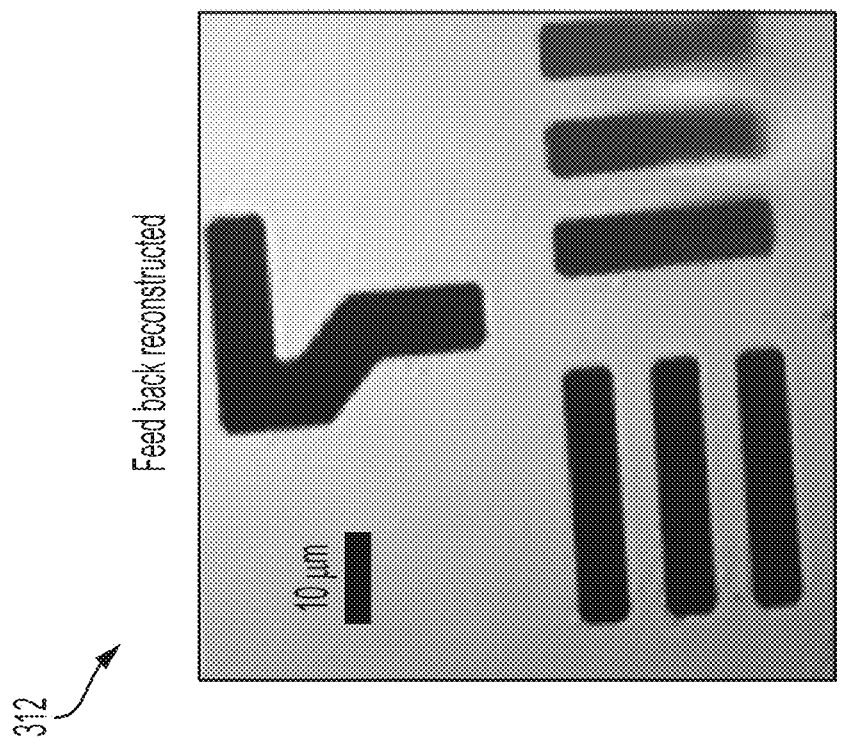
FIG. 2E is an exemplary image produced from bi-directional galvo mirror scanning of a target and with feedback, in accordance with the subject technology.
Figure 2D:
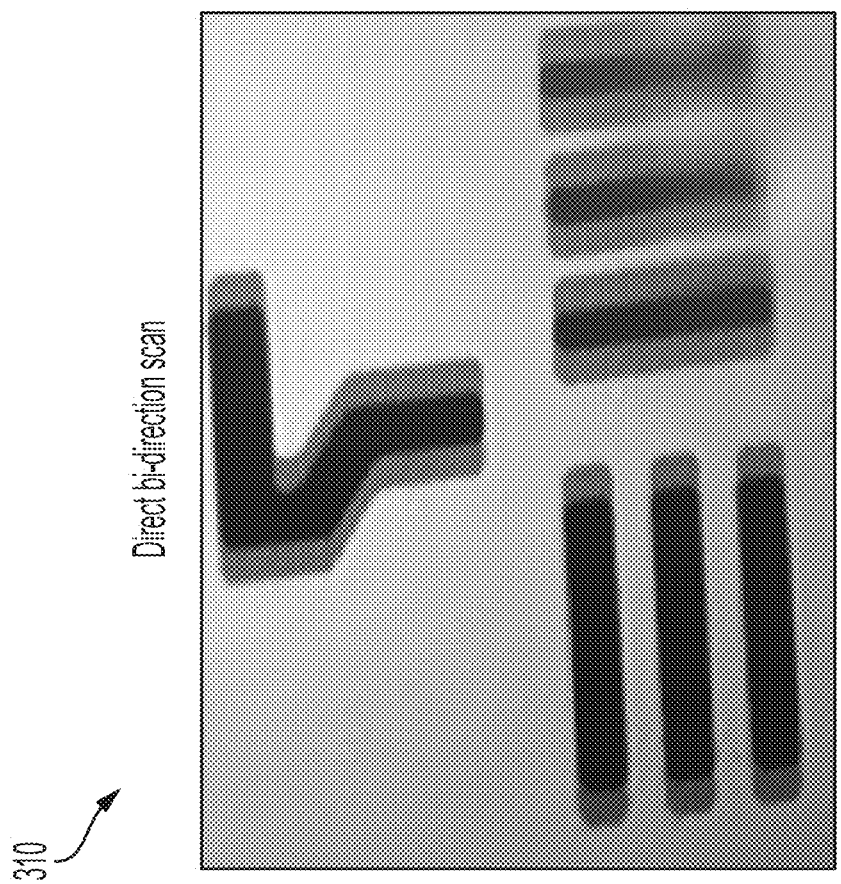
FIG. 2D is an exemplary image produced from bi-directional galvo mirror scanning of a target and without feedback, in accordance with the subject technology.

The image is then reconstructed by using linear interpolation based on the position of each pixel as illustrated in FIG. 2C. An exemplary image 310 reconstructed from a bi-direction scan is shown in FIG. 2D. By contrast, FIG. 2E shows an exemplary image 312 reconstructed from a bi-directional scan and adjusted with feedback from the galvo position sensor, as discussed above.

Figure 3B:
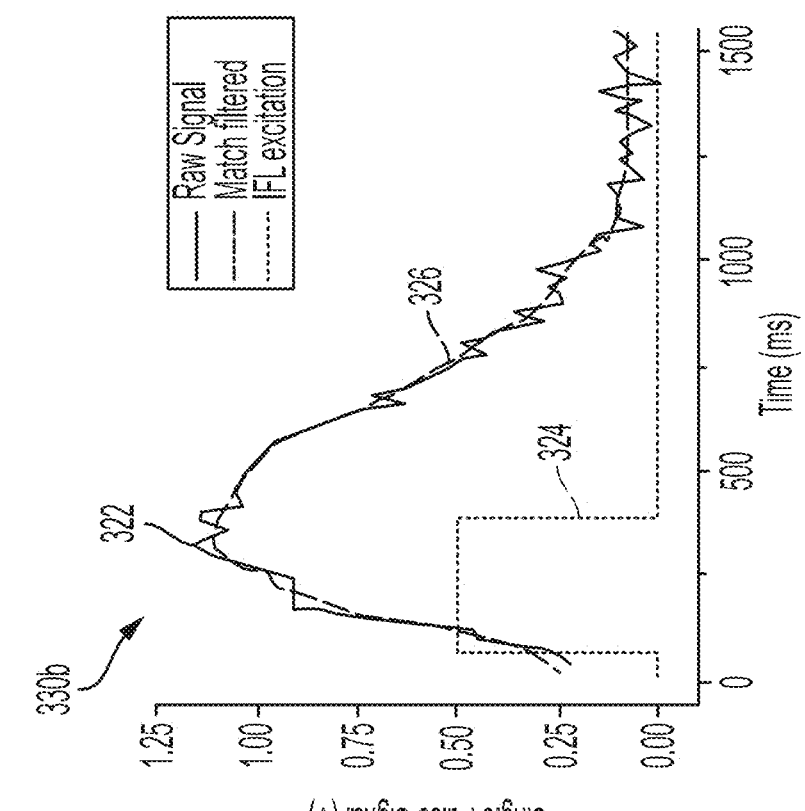
FIG. 3B is a graph of the signal of FIG. 3A with signal filtering and contrast extraction, in accordance with the subject technology.
Figure 3A:
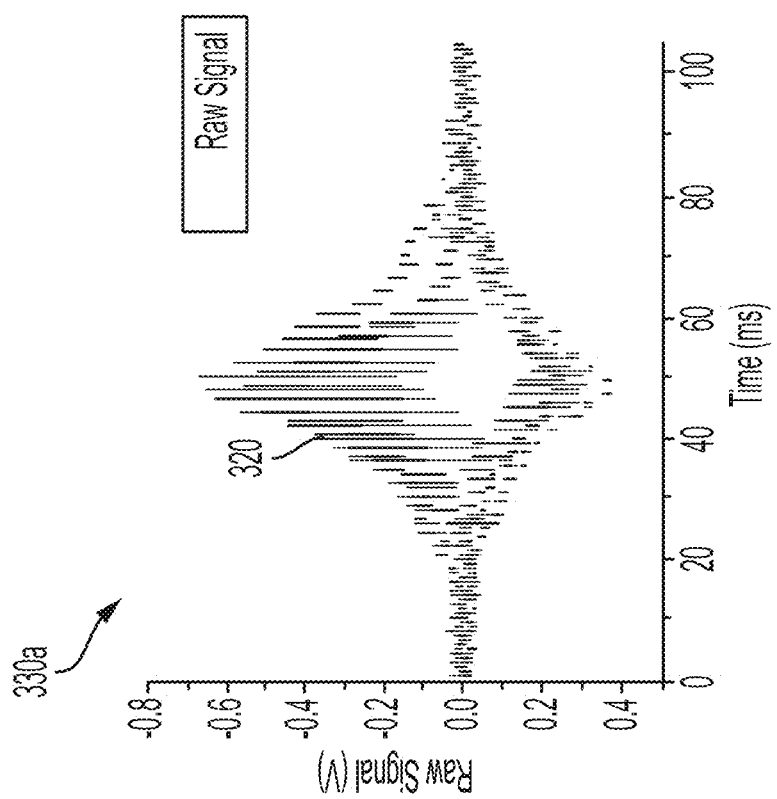
FIG. 3A is a graph of a raw signal detected from across a single PMMA particle, in accordance with the subject technology.
Figures 3C, 3D:
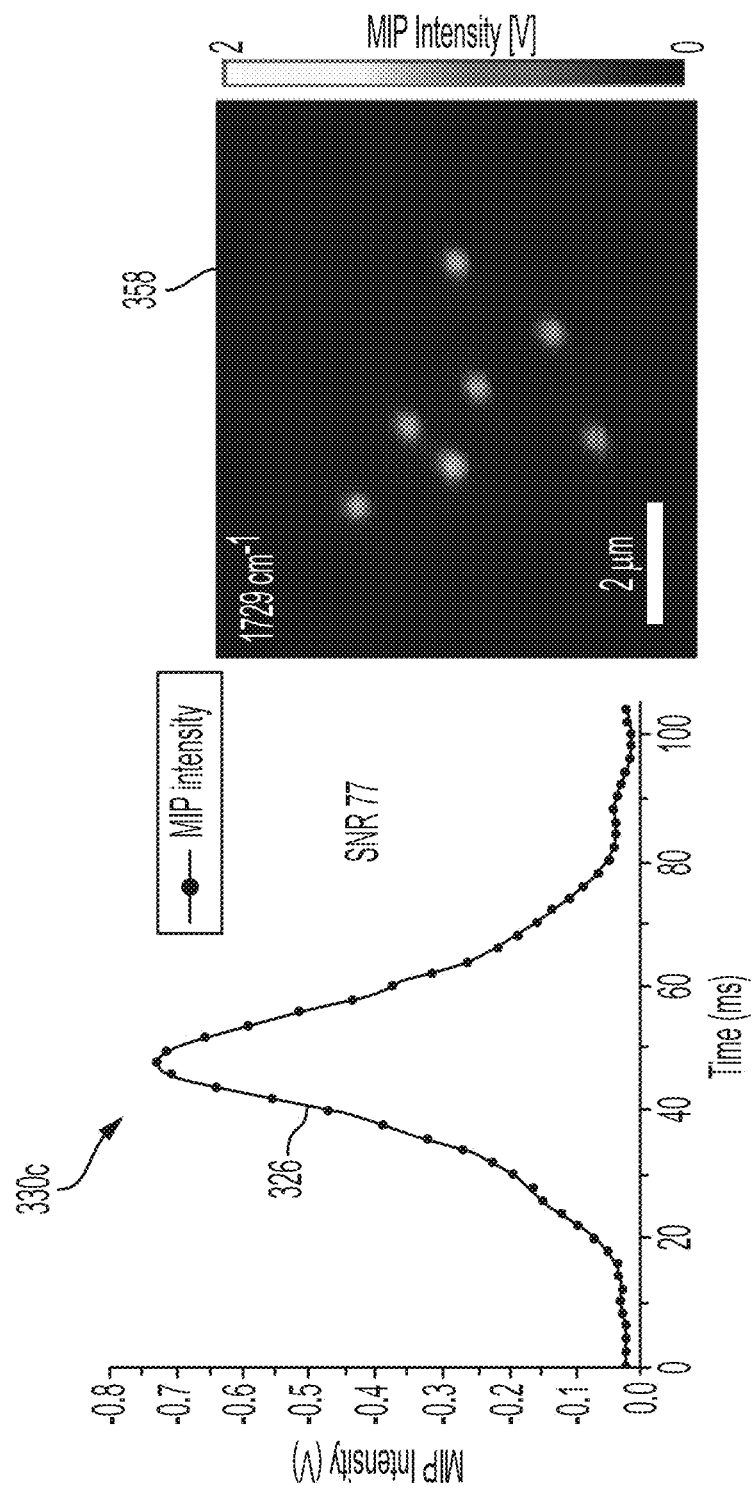
FIG. 3C is a graph of the signal of FIG. 3A after intensity extraction, in accordance with the subject technology.
FIG. 3D is a single-pulse MIP image of PMMA particles, in accordance with the subject technology.

Referring now to FIGS. 3A-3H, exemplars are shown after using the system 100 described herein to image polymethyl methacrylate (PMMA) nanoparticles of 500 nm diameter with video-rate MIP imaging. In particular, FIG. 3A shows acquired raw signal of a line across a signal PMMA particle. FIG. 3B shows the signal with signal filtering and contrast extraction. FIG. 3C shows the signal after intensity is extracted from the signal of FIG. 3A. FIG. 3D shows single-pule imaging of 500 nm diameter PMMA particles, while FIGS. 3E-3H show MIP imaging of PMMA particles in a large field of view.

The PMMA particles (e.g. MMA500, Phosphorex) in solution form were first diluted with deionized water. One droplet of the solution was then spread on the surface of a calcium fluoride $CaF_2$ substrate with 0.2 mm thickness for imaging. In this embodiment, the photothermal signal was detected from backward scattering (though the system described herein supports photothermal detection in both forward and backward scattering via detectors 134d and 134b). A QCL laser (e.g. IR laser 108) was running at 500 kHz with a 600 ns pulse width. The laser scan imaging is performed with a pixel dwell time of 2 μs, corresponding to a single pulse measurement. By tuning the IR excitation to 1729 $cm^{-1}$, corresponding to the absorption peak of the CO=O bond of PMMA, the single pulse photothermal from each particle can be clearly resolved by our wideband detection system as shown in FIG. 3A (with graph line 320 of graph 330a showing raw signal over time).

The signal is further processed by applying matched filtering and extracting the modulation amplitude as the contrast of each pixel as illustrated by graphs 330b, 330c in FIGS. 3B-C. In graphs 330b, 330c, graph line 322 represents raw signal strength, graph line 324 represents IR excitation, graph line 326 represents the signal after matched filtering, and graph line 328 represents the signal after extraction of modulation amplitude. The MW intensity is extracted by subtracting the peak amplitude after heating and complete decay.

Figures 3E, 3F:
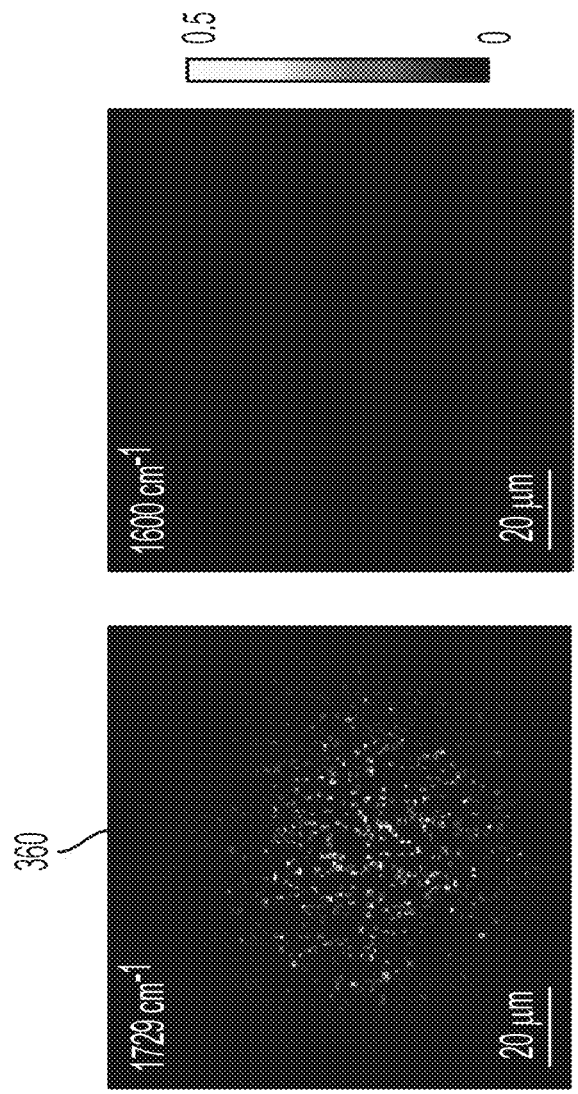
FIGS. 3E-H are images of MIP imaging of PMMA particles in a large FOV, in accordance with the subject technology.
Figure 3H:
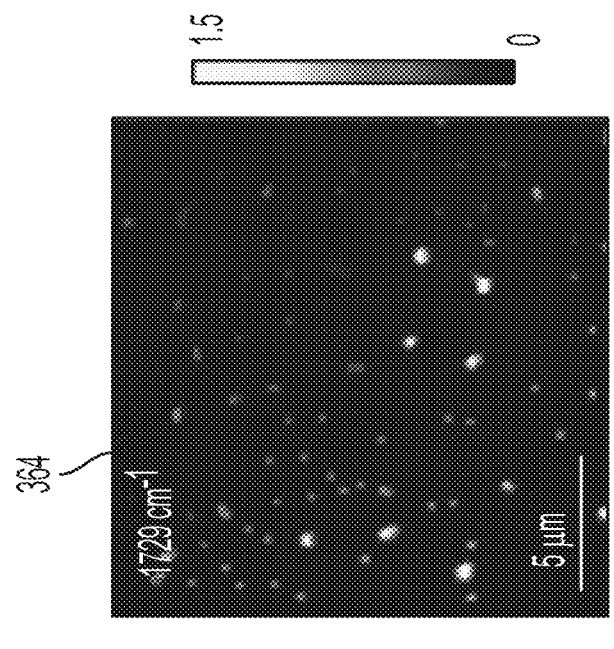
Figure 3G:
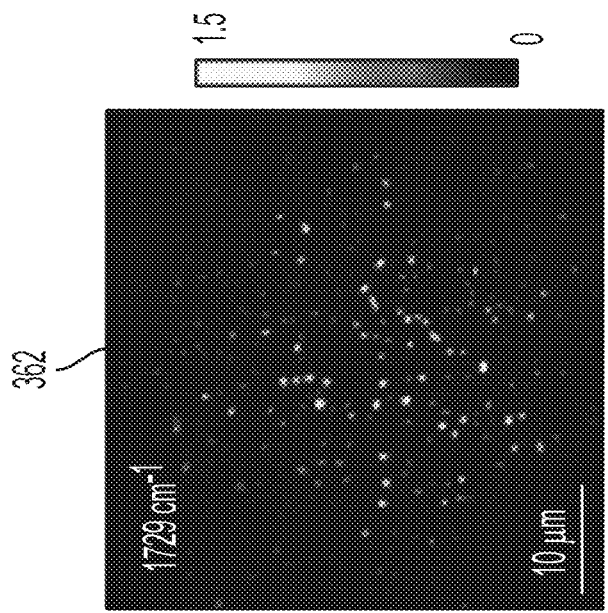

The raster-scanned photothermal image is then reconstructed, as shown in image 358 of FIG. 3D, by applying the linear interpolation using the galvo position feedback. The signal-to-noise ratio of the indicated sub micron scale particle is over 70. In addition to video-rate MW imaging, with synchronously scanned IR and probe lasers, a uniform imaging field of view (FOV) over 200 μm can be maintained without compromising the speed. The high-speed large area imaging is shown as reference numeral 360 of FIG. 3E. The imaging size is set to 800×800 with a pixel size of 150 nm. The chemical contrast is shown by tuning the IR excitation at 1729 $cm^{-1}$ and 1600 $cm^{-1}$ accordingly. FIGS. 3G and 3H show zoomed in images 362, 364 of the image 360 of FIG. 3E, showing the well-maintained spatial resolution and sensitivity. As the scanning range is more than 200 μm, the excitation fluence drops due to the beam cut at the IR objective entrance pupil. This issue can be resolved with an all-reflective relay design, which can further enlarge the system FOV over 1 mm. Briefly, the laser scanning MW microscope structure disclosed herein supports submicron resolution imaging over 1 mm FOV without requiring sample movement and stitching, which significantly facilitates the bioimaging application that requires fast dynamics and high throughput at the same time.

Leveraging the largely improved imaging throughput and the fast-tuning function of the QCL laser, we extend the system's ability for high-speed mid-infrared spectroscopic imaging to further improve the chemical specificity. Conventional MW imaging is implemented by exciting a single isolated IR band with a narrow line laser. While it has been proved with good chemical selectivity for differentiating substances with distinct molecular compositions, single-color imaging is not able to resolve overlapping bands contributed by target molecules from background components or quantitatively differentiate the molecular substructure.

Figure 4A:
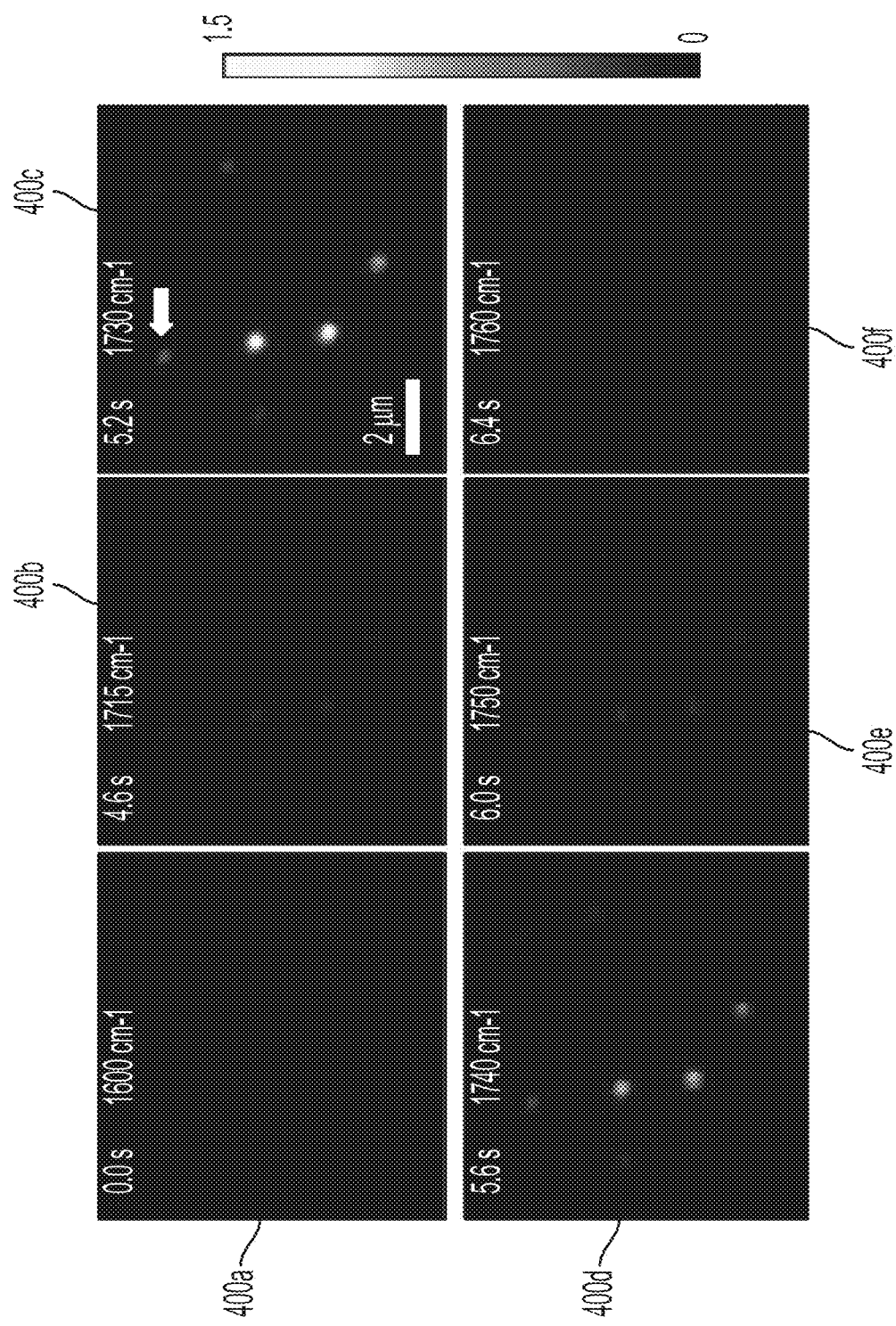
FIG. 4A is a hyperspectral image from a video-rate recording laser, in accordance with the subject technology.
Figure 4B:
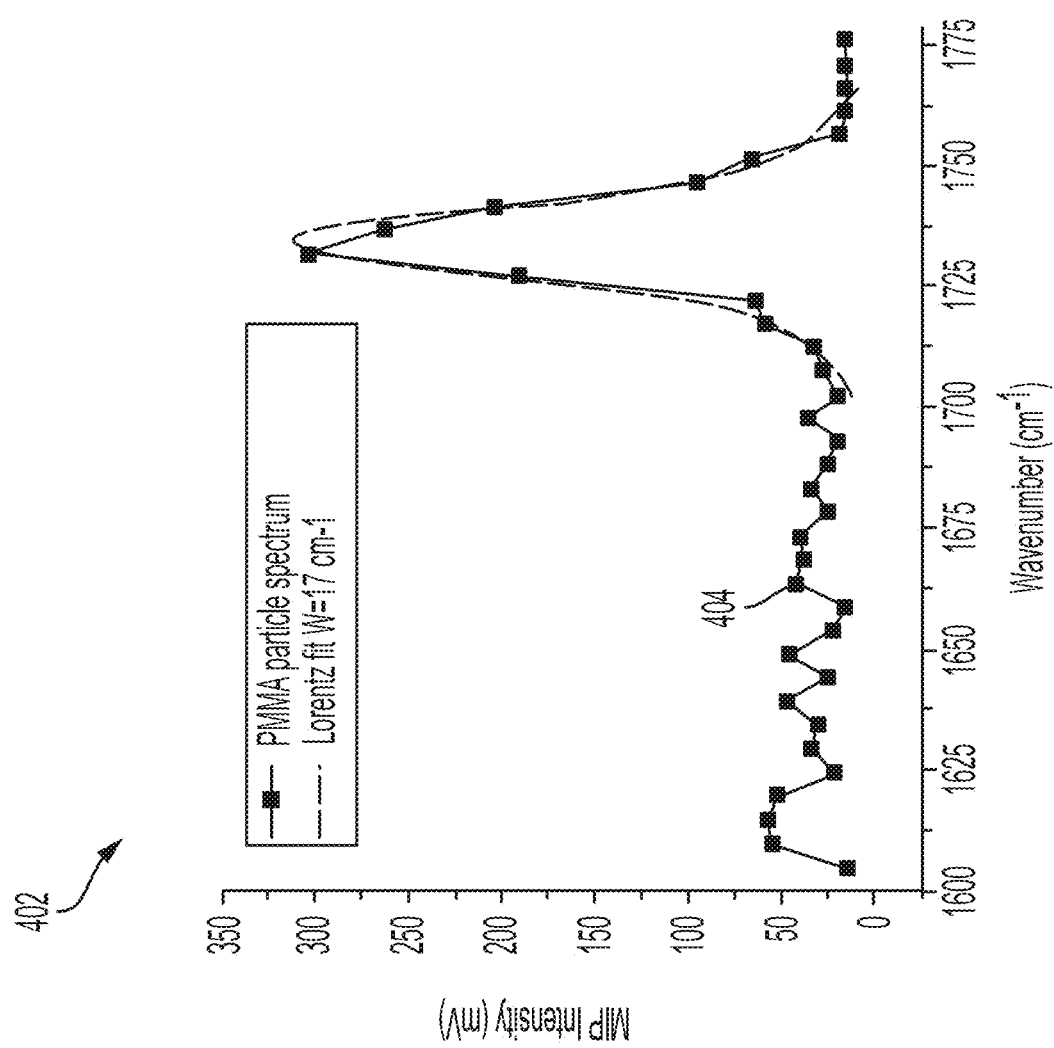
FIG. 4B is a graph of PMMA particle spectrum evaluated at the indicated particle from FIG. 4A, in accordance with the subject technology.

With the video-rate imaging ability, high-speed spectroscopic imaging can be performed via sweeping the mid-infrared laser during a continuous video recording. FIG. 4A shows the hyperspectral imaging result of D=500 nm PMMA particles. To generate the images 400a-400f of FIG. 4A, imaging at 20 frames per second was perform and the laser was swept at the speed of 50 cm$^{-1}$, providing effective spectral resolution at 2.5 cm$^{-1}$. The underlying spectrum at indicated single particle is plotted in graph 402 of FIG. 4B, as shown by graph line 404. This spectroscopic imaging covers a 200 cm$^{-1}$ spectrum within 4 seconds. Since the state of art QCL source can operate in a wavelength sweeping mode with a speed up to 1000 cm$^{-1}$/s, versatile combinations of spectral resolution and imaging speed can be freely selected under such imaging mode. Collectively, the spectroscopic imaging mode fully utilizing the fast-sweeping function of the QCL together with the high-speed laser scan imaging scheme largely enhanced the chemical specificity of the MIP microscope, enabling molecules resolved imaging in a highly complex biological sample. This can be applied, for example, in an application in living fungal cell imaging for resolving chemical composition inside the cell wall.

Figure 5C:
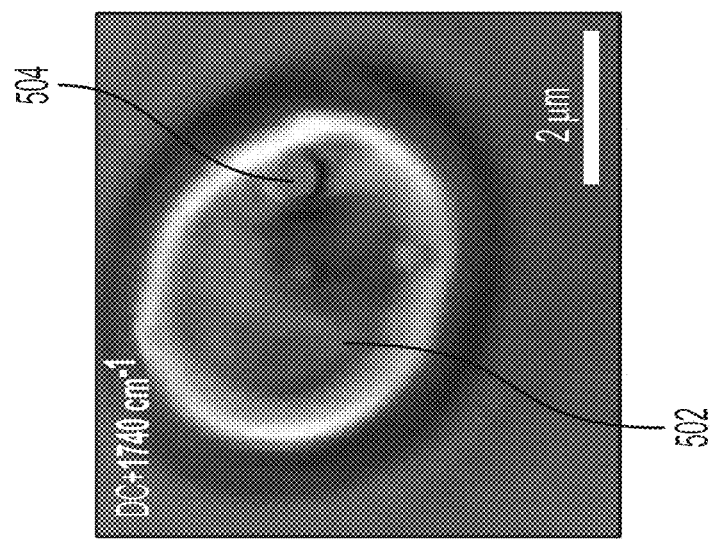
FIG. 5C is a merged image of FIGS. 5A and 5B, in accordance with the subject technology.
Figure 5B:
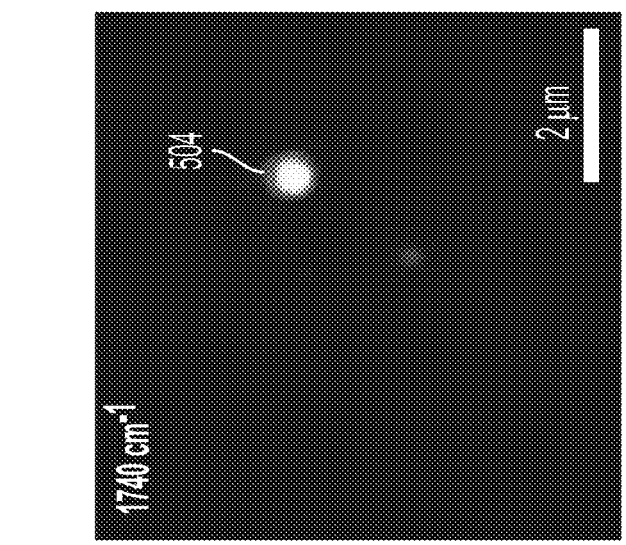
FIG. 5B is an image showing lipid components of the sample of FIG. 5A with IR absorption, in accordance with the subject technology.
Figure 5A:
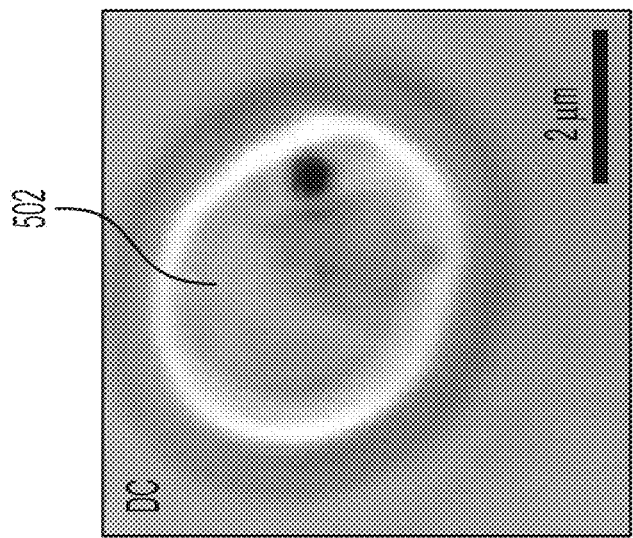
FIG. 5A is a transmission image of a living fungal cell sample, in accordance with the subject technology.
Figures 5D, 5E, 5F:
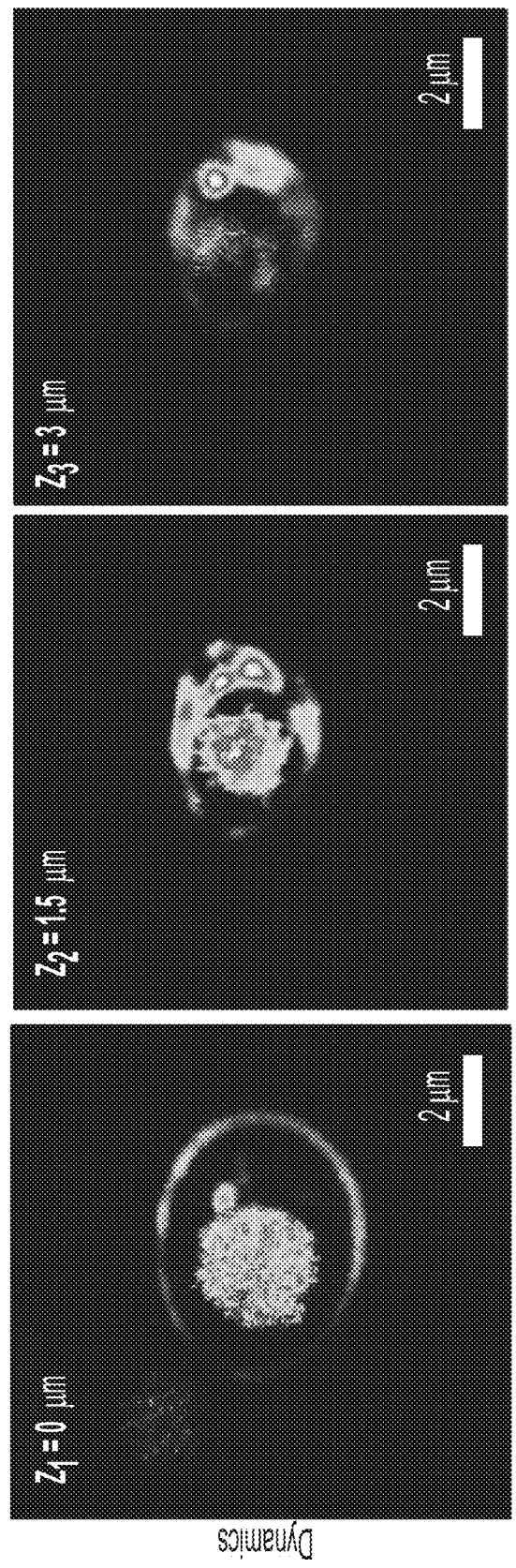
FIGS. 5D-5F are reconstructed images of the sample showing volumetric imaging of the fungal cell sample of FIG. 5A, in accordance with the subject technology.

Referring now to FIGS. 5A-5F, video rate MIP imaging of fast lipid dynamics in living fungal cells is shown, as obtained by the system described herein. In particular, FIG. 5A shows a transmission image of the living fungal cell sample 502. FIG. 5B shows lipid components 504 of the sample with IR absorption at 1740 cm$^{-1}$. FIG. 5C is a merged image of FIGS. 5A and 5B. FIGS. 5D-5F show lipid dynamics within the sample 502 at different focal planes.

Resolving chemical compositions in a highly dynamic system is always a big challenge that sets demanding requirements for detection sensitivity and speed. Leveraging the large IR absorption cross-section and fast scanning scheme, we demonstrated chemical imaging of dynamics inside living cells using the laser scan MIP microscope system 100. Using the system 100 described herein, we acquired the fast lipid dynamics inside fungal cells at the speed of 20 Hz. By tuning the IR excitation to 1740 cm$^{-1}$ corresponding to the absorption peak of the CO=O bond in lipid, the individual lipids droplets and cell membrane can be specifically imaged. The significant lipid motility of living fungal was revealed, as shown in FIGS. 5A-5C. Those lipid components serve important functions like an energy source, membrane construction, and synthesis precursors in fungal cells. Thus, it is crucial to further investigate their involvement in metabolism pathways in real-time and in vivo. The technology disclosed herein provides a new way to use the spectroscopic method for metabolism imaging.

In addition to fast imaging of a sample in the X-Y plane, the 3D dynamics can be resolved by taking advantage of the high axial resolution (around 700 nm) of the confocal scanning system 100. By tuning the objective lens 116 at the different focal planes, volumetric imaging of the fungal cells was performed as shown in FIGS. 5D-5F. The results showed a distinctive 3D distribution of lipids inside living cells. This strong sectioning capability is crucial to investigating the actual movement of small organelles and the distribution of low concentration molecules.

Referring now to FIGS. 6A-6D, results from spectroscopic MIP imaging of fungal cell wall in vivo are shown. The fungal cell wall plays an important role for maintain cell function, and proliferation. It is also the most common target of antifungal drugs for pathogenetic yeast. Direct investigation of its chemical composition and morphology change during cell-drug interaction would greatly fertilize the development of a new treatment. However, the thickness of the fungal cell wall is extremely thin at about 100 nm. This makes it extremely hard to visualize using traditional optical microscopes without dye. With the molecule specificity, submicron resolution and high imaging speed, the disclosed system 100 is able to visualize the cell wall dynamics together with chemical composition in vivo.

Figures 6A, 6B:
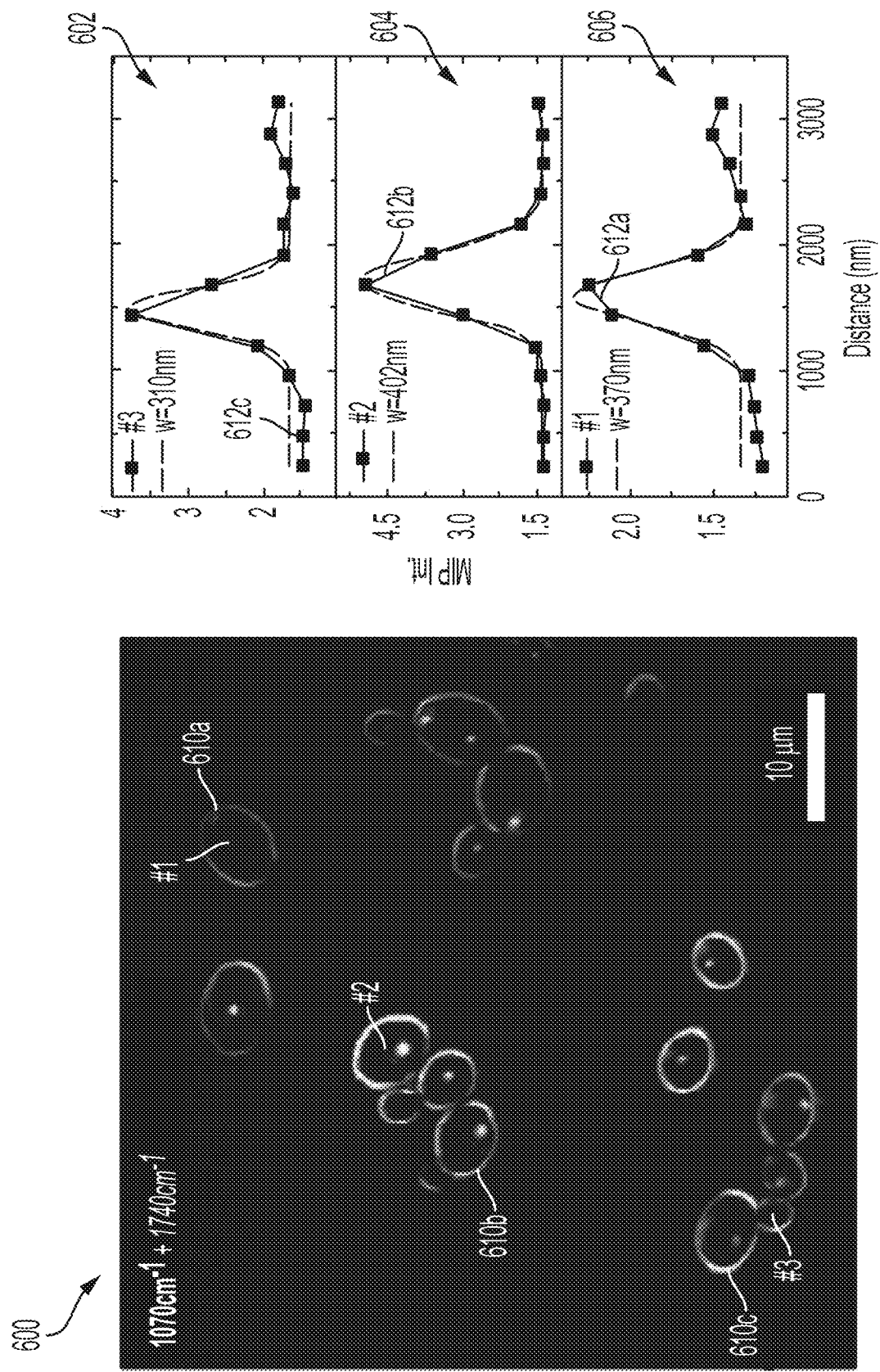
FIG. 6A is an MIP image of a fungal cell wall in vivo, in accordance with the subject technology.
FIG. 6B is a line plot of the fungal cell walls of FIG. 6A, in accordance with the subject technology.
Figure 6D:
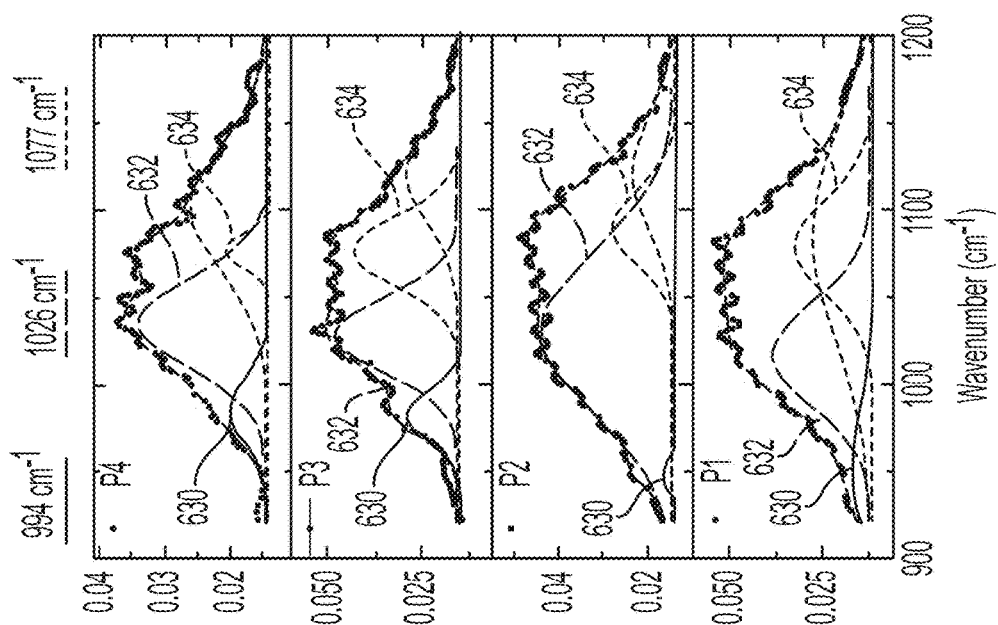
FIG. 6D is a graph of spectra positions of the fungal cells from FIG. 6C, in accordance with the subject technology.
Figure 6C:
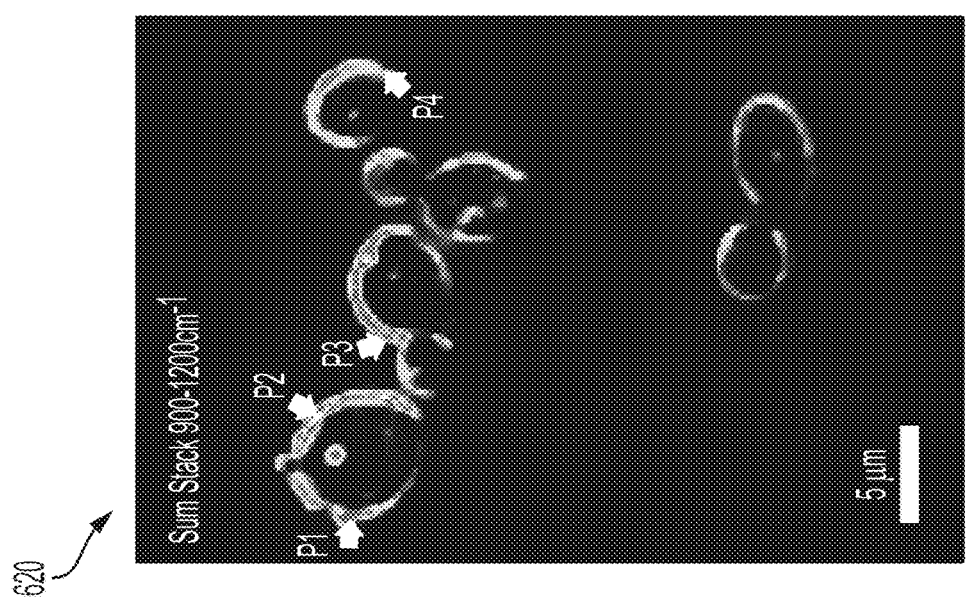
FIG. 6C is a spectroscopic image of fungal cells generated from a laser sweep from 900 $cm^{-1}$ to 1200 $cm^{-1}$, in accordance with the subject technology.

The fungal cell wall is majorly composed of polysaccharides including chitin and glucan, which own huge IR absorption in the C—O region. With switching the IR excitation to 1070 cm$^{-1}$, corresponding to the absorption peak of beta-1,3-glucan. The cell wall morphology of individual fungi cells can be clearly resolved as shown in image 600a of FIG. 6A. The line plot of the indicated position in from image 600 is shown graph 602, 604, 606 of FIG. 6B. In particular, the line plot of molecule 610a is represented by graph line 612a, the line plot of molecule 610b is represented by graph line 612b, and the line plot of molecule 610c is presented by graph line 612c. To further provide molecule insight into cell wall composition, spectroscopic imaging is performed by sweeping the QCL laser from 900 cm$^{-1}$ to 1200 cm$^{-1}$. The sum-up intensity of the hyperspectral stack is shown in the image 620 of FIG. 6C. The IR spectrum in the C—O group region can be clearly resolved at each pixel. Moreover, through the multivariate analysis of the spectrum behind, a distinctive composition ratio of the different cells is revealed as shown in FIG. 6D, indicating a high heterogeneity distribution among cells. FIG. 6D shows graph lines of the spectra at the positions of FIG. 6C, with peak deconvolution performed at 994 cm$^{-1}$ (graph line 630), at 1026 cm$^{-1}$ (graph line 632), at 1077 cm$^{-1}$ (graph line 634), corresponding to beta 1-6 glucans, beta 1-4 glucans, and beta 1-3 glucans, respectively.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

The references below are background believed to be understood by those of skill in the art:
1. Cheng, J.-X. & Xie, X. S. Vibrational spectroscopic imaging of living systems: An emerging platform for biology and medicine. *Science* 350, aaa8870 (2015).
2. Bai, Y., Yin, J. & Cheng, J.-X. Bond-selective imaging by optically sensing the mid-infrared photothermal effect. *Science Advances* 7, eabg1559 (2021).
3. Baker, M. J. et al. Using Fourier transform IR spectroscopy to analyze biological materials. *Nature protocols* 9, 1771-1791 (2014).

4. Bhargava, R. Infrared spectroscopic imaging: the next generation. *Applied spectroscopy* 66, 1091-1120 (2012).
5. Ash, E. & Nicholls, G. Super-resolution aperture scanning microscope. *Nature* 237, 510-512 (1972).
6. Katzenmeyer, A. M., Holland, G., Kjoller, K. & Centrone, A. Absorption spectroscopy and imaging from the visible through mid-infrared with 20 nm resolution. *Analytical chemistry* 87, 3154-3159 (2015).
7. Wang, L. et al. Nanoscale simultaneous chemical and mechanical imaging via peak force infrared microscopy. *Science advances* 3, e1700255 (2017).
8. Pavlovetc, I. M. et al. Infrared photothermal heterodyne imaging: Contrast mechanism and detection limits. *Journal of Applied Physics* 127, 165101 (2020).
9. Zhang, D. et al. Depth-resolved mid-infrared photothermal imaging of living cells and organisms with submicrometer spatial resolution. *Science advances* 2, e1600521 (2016).
10. Li, Z., Aleshire, K., Kuno, M. & Hartland, G. V. Super-resolution far-field infrared imaging by photothermal heterodyne imaging. *The Journal of Physical Chemistry B* 121, 8838-8846 (2017).
11. Yin, J. et al. Nanosecond-resolution photothermal dynamic imaging via MHZ digitization and match filtering. *Nature Communications* 12, 7097, doi:10.1038/s41467-021-27362-w (2021).
12. Bai, Y. et al. Ultrafast chemical imaging by widefield photothermal sensing of infrared absorption. *Science advances* 5, eaav7127 (2019).
13. Zhang, D. et al. Bond-selective transient phase imaging via sensing of the infrared photothermal effect. *Light: Science & Applications* 8, 1-12 (2019).
14. Li, X. et al. Fingerprinting a living cell by Raman integrated mid-infrared photothermal microscopy. *Analytical chemistry* 91, 10750-10756 (2019).
15. Saar, B. G. et al. Video-rate molecular imaging in vivo with stimulated Raman scattering. *science* 330, 1368-1370 (2010).
16. Michels, W. C. & Curtis, N. L. A pentode lock-in amplifier of high frequency selectivity. *Review of Scientific Instruments* 12, 444-447 (1941).
17. Xi, P., Ren, Q. & Liu, Y. *Scanning and image reconstruction techniques in confocal laser scanning microscopy*. (INTECH Open Access Publisher, 2011).
18. Amirsolaimani, B., Cromey, B., Peyghambarian, N. & Kieu, K. All-reflective multiphoton microscope. *Optics Express* 25, 23399-23407 (2017).
19. Lin, H., Liao, C.-S., Wang, P., Kong, N. & Cheng, J.-X. Spectroscopic stimulated Raman scattering imaging of highly dynamic specimens through matrix completion. *Light: Science & Applications* 7, 17179-17179 (2018).
20. Noverr, M. C. & Huffnagle, G. B. Regulation of *Candida albicans* morphogenesis by fatty acid metabolites. *Infection and immunity* 72, 6206-6210 (2004).
21. Garcia-Rubio, R., de Oliveira, H. C., Rivera, J. & Trevijano-Contador, N. The fungal cell wall: *Candida, Cryptococcus*, and *Aspergillus* species. *Frontiers in Microbiology*, 2993 (2020).

What is claimed is:

1. A mid-infrared photothermal microscopy system for imaging a sample comprising:
   a mid-infrared optical source configured to generate a mid-infrared beam, the mid-infrared beam being directed along a first optical path towards the sample to heat the sample;
   a probe light source configured to generate a probe light, the probe light being directed along a second optical path towards the sample, the second optical path overlapping and counter-propagating with the first optical path at the sample;
   a first laser scanner comprising at least one movable mirror, positioned along the first optical path and configured to rotate to redirect light and scan the sample with the mid-infrared beam;
   a second laser scanner comprising at least one movable mirror, positioned along the second optical path and configured to rotate to redirect light and scan the sample with the probe light,
   a reflective objective lens arranged along the first optical path between the mid-infrared optical source and the sample; and
   a second objective lens arranged along the second optical path between the probe light source and the sample,
   wherein the laser scanners are driven to rotate such that the mid-infrared beam and the probe light scan the sample synchronously.

2. The system of claim 1, further comprising a photodiode configured to detect probe light from the sample to generate a reconstructed image of the sample.

3. The system of claim 2, wherein the mid-infrared beam is a pulsed beam and wherein the MIP system further comprises single pulse photothermal detection.

4. The system of claim 1, wherein:
   the first laser scanner comprises a first pair of scanning mirrors, including a first mirror and a second mirror; and
   the second laser scanner comprises a second pair of scanning mirrors, including a third mirror and a fourth mirror.

5. The system of claim 4, wherein the first pair of scanning mirrors have orthogonal scanning axes; and
   the second pair of scanning mirrors have orthogonal scanning axes.

6. The system of claim 1, further comprising a digital-to-analog device configured to generate four control signals to drive the laser scanners for synchronous scanning of the mid-infrared beam and probe lights.

7. The system of claim 6, wherein at least one of the four control signals is adjusted by an angle scaling factor based on the focal lengths of probe light and mid-infrared objectives and the beam expansion ratio of relay systems, the angle scaling factor determining relative angular motion for the laser scanners for the probe light and the mid-infrared beam.

8. The system of claim 1, wherein a relative scaling of motion for the mid-infrared and probe light laser scanning mechanisms is configured such that the probe light and mid-infrared beam are focused to overlapping locations on the sample during scanning.

9. The system of claim 1, further comprising:
   a first photodiode positioned along the first optical path and configured to detect the probe light passing through the sample; and
   a second photodiode positioned along the second optical path and configured to detect the probe light returning after reflecting off the sample.

10. The system of claim 1, wherein the mid-infrared beam is pulsed with a repetition rate between 500 kHz to 1 MHz and a duty cycle of less than 30%.

11. The system of claim 1, wherein the pairs of laser scanners are configured to cause the sample to be scanned at a frequency of substantially 3 kHz.

12. The system of claim 1, further comprising a scan lens positioned on the second optical path between the second pair of laser scanners and the substrate, wherein the probe light is conjugated to a back pupil of the second objective lens with the scan lens.

13. The system of claim 12, further comprising a tube lens positioned on the second optical path between the second objective lens and the scan lens, wherein the tube lens introduces a beam expansion to substantially fill the back pupil of the objective lens.

14. The system of claim 1, wherein a focus of the mid-infrared beam is aligned to overlap with a focus of the probe light.

15. The system of claim 1, wherein at least one of the laser scanners comprises at least one galvo mirror.

16. The system of claim 1, wherein the probe light and mid-infrared beam are scanned across a shared focal spot of the sample as each of the laser scanners rotates in both a forward direction and a backward direction, the backward direction being opposite the forward direction.

17. The system of claim 16, wherein rotational movement of the laser scanners follows a sinusoidal pattern.

18. The system of claim 1, further comprising a laser scanning position sensor configured to measure a position of at least one of the laser scanners during scanning, wherein a reconstructed image of the sample is adjusted based on feedback from the galvo position sensor.

19. The system of claim 1, wherein the laser scanners provide an effective scan area of the mid-IR and probe lights of at least 100 micrometers on a side.

20. The system of claim 1, wherein the laser scanners provide an effective scan area of the mid-IR and probe lights of at least 200 micrometers on a side.

21. A method of operating a photothermal infrared microscope to image a sample, the method comprising:
illuminating the sample with a beam of mid-infrared light to heat the sample by directing the beam of infrared light along a first optical path towards the sample;
illuminating the sample with a beam of probe light by directing the probe light along a second optical path towards the sample, the second optical path overlapping and counter-propagating with the first optical path at the sample;
providing a first laser scanner comprising at least one movable mirror, positioned along the first optical path and configured to rotate to redirect light and scan the sample with the mid-infrared beam;
providing a second laser scanner comprising at least one movable mirror, positioned along the second optical path and configured to rotate to redirect light and scan the sample with the probe light;
providing a reflective objective lens arranged along the first optical path between the mid-infrared optical source and the sample; and
providing a second objective lens arranged along the second optical path between the probe light source and the sample;
wherein the laser scanners are driven to rotate such that the mid-infrared beam and the probe light scan the sample synchronously.

22. The method of claim 21, further comprising collecting an image of mid-infrared absorption by the sample covering an area at least 10 microns on a side in a time of 0.1 seconds or less.

23. The method of claim 21, further comprising measuring cellular dynamics within a biological cell.

24. The method of claim 21, further comprising:
collecting probe light from the sample; and
detecting a change in probe light collected from the sample at the plurality of locations on the sample in response to radiation from the mid-infrared light absorbed by the sample.

25. The method of claim 24, further comprising extracting a signal from the detected change in collected probe light to produce an image that is indicative of infrared absorption by the sample.

26. The method of claim 25, further comprising collecting a plurality of images at a plurality of mid-infrared wavelengths.

27. The method of claim 25, further comprising measuring a plurality of images at different times to record dynamic changes in the sample.

28. The method of claim 25, wherein the image indicative of infrared absorption by the sample has a signal to noise ratio of greater than 50.

* * * * *